United States Patent
Johnson et al.

(10) Patent No.: US 9,581,475 B2
(45) Date of Patent: Feb. 28, 2017

(54) MULTIPHASE FLOWMETER

(75) Inventors: Ashley Bernard Johnson, Milton (GB); Paul Simon Hammond, Bourn (GB); Gary Martin Oddie, St. Neots (GB); Cheng-Gang Xie, Sawston (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 186 days.

(21) Appl. No.: 14/127,149

(22) PCT Filed: Jun. 29, 2012

(86) PCT No.: PCT/IB2012/001304
§ 371 (c)(1),
(2), (4) Date: Jan. 14, 2014

(87) PCT Pub. No.: WO2013/005091
PCT Pub. Date: Jan. 10, 2013

(65) Prior Publication Data
US 2014/0144225 A1    May 29, 2014

Related U.S. Application Data (60) Provisional application No. 61/503,655, filed on Jul. 1, 2011.

(51) Int. Cl.
| | |
|---|---|
| *E21B 47/10* | (2012.01) |
| *G01F 1/44* | (2006.01) |
| *G01F 1/42* | (2006.01) |
| *G01F 1/74* | (2006.01) |

(52) U.S. Cl.
CPC ............... *G01F 1/44* (2013.01); *G01F 1/42* (2013.01); *G01F 1/74* (2013.01)

(58) Field of Classification Search
CPC ............... G01F 1/44; G01F 1/42; G01F 1/74
USPC .................................................. 73/152.29
See application file for complete search history.

(56) References Cited

U.S. PATENT DOCUMENTS

| | | |
|---|---|---|
| 5,591,922 A | 1/1997 | Segeral et al. |
| 6,378,380 B1 | 4/2002 | Kusters et al. |
| 6,546,809 B1 | 4/2003 | Andreussi |
| 6,935,189 B2 | 8/2005 | Richards |
| 2006/0056924 A1* | 3/2006 | Jurkovich ............ B65G 53/66 406/39 |
| 2007/0084340 A1 | 4/2007 | Dou et al. |
| 2011/0139464 A1 | 6/2011 | Henderson et al. |

OTHER PUBLICATIONS

International Search Report of PCT Application No. PCT/IB2012/001304 dated Mar. 4, 2013: pp. 1-2.

(Continued)

*Primary Examiner* — John Fitzgerald
*Assistant Examiner* — Rodney T Frank (57) ABSTRACT

A multiphase flow meter comprising two Venturis separated by a choke. The choke may be varied to adjust the properties of the multiphase fluid flow being measured. The two Venturis may be identical and may be arranged horizontally with respect to the multiphase fluid flow. The choke may be a choke in a return line of a managed pressure drilling system.

19 Claims, 3 Drawing Sheets

(56) References Cited

OTHER PUBLICATIONS

"AGAR MPFM-50 Series," Product Information, AGAR Corporation Ltd, retrieved May 12, 2013: p. 1, <http://www.agarcorp.com/Product/MPFM50.html>.

"Vega Multiphase Flow Meter," Tea Sistemi Energy and Environment Technologies, retrieved Dec. 5, 2013: pp. 1-2, <http://www.tea-group.com/brochures/VEGA%20Brochure.pdf>.

\* cited by examiner

MULTIPHASE FLOWMETER

CROSS-REFERENCE TO RELATED APPLICATIONS

This application is a United States National Stage Application under 35 U.S.C. §371 and claims priority to Patent Cooperation Treaty Application No. PCT/IB2012/001304 filed Jun. 29, 2012, which claims the benefit of U.S. Provisional Patent Application Ser. No. 61/503,655 filed Jul. 1, 2011. Both of these applications are incorporated herein by reference in their entireties.

BACKGROUND

The present invention relates to a method and a system for measuring properties of multiphase flows. More particularly, but not by way of limitation, methods and systems for measuring flow rates of multiphase flows in managed pressure drilling operations are described.

The drilling of a borehole is typically carried out using a steel pipe known as a drillstring that is coupled with a drill bit on its lowermost end. The entire drillstring may be rotated using an over-ground drilling motor, or the drill bit may be rotated independently of the drill string using a fluid powered motor or motors mounted on the drillstring just above the drill bit. As drilling progresses, a flow of drilling fluid is used to carry the debris created by the contact between the drill bit and the formation being drilled during the drilling process out of the wellbore. The drilling fluid is pumped through an inlet line down the drillstring and through the drill bit, and returns to the surface via an annular space between the outer diameter of the drillstring and the borehole (generally referred to as the annulus).

Drilling fluid is a broad drilling term that may cover various different types of drilling fluids. The term 'drilling fluid' may be used to describe any fluid or fluid mixture used during drilling and may cover such things as air, nitrogen, misted fluids in air or nitrogen, foamed fluids with air or nitrogen, aerated or nitrified fluids, drilling mud to heavily weighted mixtures of oil or water with solid particles.

The drilling fluid flow through the drillstring may be used to cool the drill bit. In conventional overbalanced drilling, the density of the drilling fluid is selected so that it produces a pressure at the bottom of the borehole ("the bottom hole pressure" or "BHP"), which is high enough to counterbalance the pressure of fluids in the formation surrounding the borehole (often referred to as the "formation pore pressure"). By counter-balancing the pore pressure, the BHP acts to prevent the inflow of fluids from the formations surrounding the borehole into the borehole that is being drilled. However, if the BHP falls below the formation pore pressure, formation fluids, such as gas, oil and/or water may enter the borehole and produce, what is referred to in the drilling industry as a kick. By contrast, if the BHP is very high, the BHP may be higher than the fracture strength of the formation surrounding the borehole, and this high BHP may then result in fracturing of the formation surrounding the borehole, which may in turn lead to loss of fluid from the borehole into the formation. Consequently, when the formation is fractured in this way, the drilling fluid may enter the formation and be lost from the drilling process. This loss of drilling fluid from the drilling process may cause a reduction in BHP and as a consequence cause a kick as the BHP falls below the formation pore pressure.

In order to overcome the problems of kicks and/or fracturing of formations during drilling, a process known as managed pressure drilling ("MPD") has been developed. In MPD various techniques may be used to control the BHP during the drilling process. These techniques may include flowing a gas into the borehole in order to reduce the BHP that is created by fluids, mainly drilling fluids in the borehole.

In MPD, the outflow from the borehole being drilled may be measured to monitor the MPD operation, including monitoring changes in the outflow rate and the outflow gas fraction. The outflow data may be used for influx/efflux detection as well as for determining gas distribution for monitoring and control purposes. Often the multiphase fluid coming out of the borehole has a high gas fraction and as a result measuring the flow rates of the outflow/phases of the outflow may be problematic.

BRIEF SUMMARY OF THE DISCLOSURE

In one embodiment, a system for measuring one or more flow characteristics of a multiphase fluid flow is provided, the system comprising: a first Venturi; a first pressure sensor configured to measure a first pressure in the throat of the first Venturi; a first differential pressure sensor configured to measure a first differential pressure between the throat of the first Venturi and a location upstream or downstream of the throat of the first Venturi; a second Venturi; a second pressure sensor configured to measure a second pressure in the throat of the second Venturi; a second differential pressure sensor configured to measure a second differential pressure between the throat of the second Venturi and a location upstream or downstream of the throat of the second Venturi; and a choke disposed between the first and the second Venturis.

In a further embodiment, a method for measuring one or more flow characteristics of a multiphase fluid flowing through a conduit is provided, comprising: flowing the multiphase fluid flow through a first Venturi and a second Venturi; choking the multiphase fluid flow, wherein the multiphase fluid flow is choked at a location in the conduit between the first Venturi and the second Venturi; measuring a first pressure in a throat of the first Venturi; measuring a first differential pressure between the throat of the first Venturi and a first position in the conduit upstream or downstream of the throat of the first Venturi; measuring a second pressure in the throat of the second Venturi; measuring a second differential pressure between the throat of the second Venturi and a second position in the conduit upstream or downstream of the throat of the second Venturi; and using the first and the second pressures and the first and the second differential pressures to process the one or more flow characteristics of the multiphase fluid flow.

In some embodiments of the present invention, the first and the second Venturis may be identical. In an embodiment of the present invention, a choke may be used to provide that flow properties of a multiphase mixture being investigated are different in the first and the second Venturis. In certain aspects, the choke may be varied to alter the flow properties of the multiphase mixture in the first Venturi and/or the second Venturi.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Figure 1:
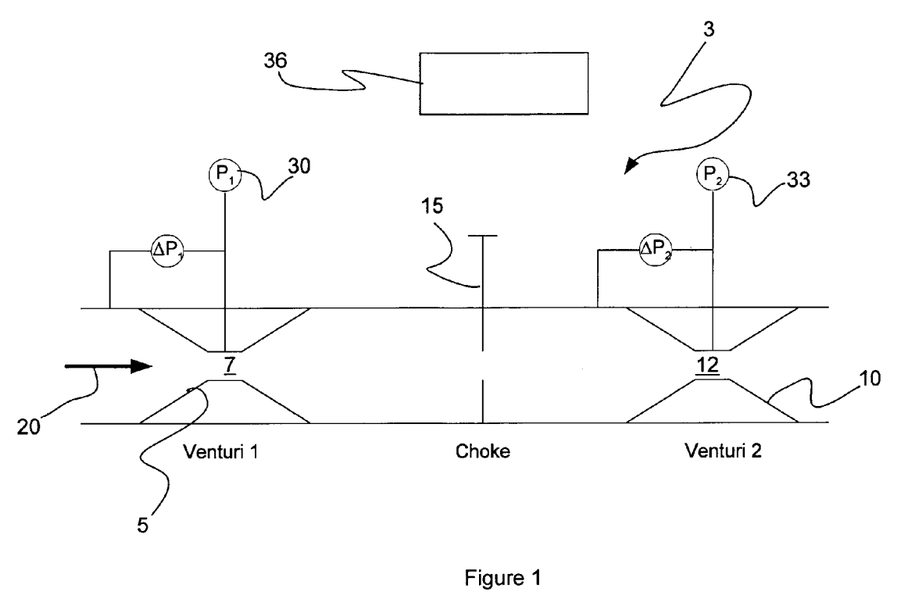
FIG. 1 illustrates a multiphase flowmeter, in accordance with an embodiment of the present invention.

FIG. 1 illustrates a multiphase flowmeter in accordance with one embodiment of the present invention. In an embodiment of the present invention, a flowmeter 3 comprises a first Venturi 5 and a second Venturi 10 separated by a choke 15. In some aspects the first Venturi 5 and/or the second Venturi 10 may comprise an orifice plate, a flow restrictor and/or the like.

In operation, the flowmeter 3 is coupled with a section of pipe (not shown) and a multiphase hydrocarbon mixture in the section of pipe produces a fluid flow 20 through the flowmeter 3. As the multiphase mixture flows through the flowmeter 3, a first pressure sensor 30 may measure a pressure $P_1$ in a first throat 7 of the first Venturi 5. The pressure sensor 30 and/or a combination of multiple pressure sensors may be used to measure a differential pressure $\Delta P_1$ between the pressure $P_1$ in the first throat 7 of the first Venturi 5 and a pressure upstream or downstream of the first Venturi 5.

A second pressure sensor 33 may be used to measure a pressure $P_2$ in a second throat 12 of the second Venturi 10. The second pressure sensor 33 and/or a combination of multiple pressure sensors may be used to measure a differential pressure $\Delta P_2$ between the pressure $P_2$ in a second throat 12 of the second Venturi 10 and a pressure upstream or downstream of the second Venturi 10.

In an embodiment of the present invention, the choke 15 is disposed between the first Venturi 5 and the second Venturi 10. In an embodiment of the present invention, the choke 15 may be used to alter the flow characteristics of the fluid flow 20 flowing through the first Venturi 5 and/or the second Venturi 10. In certain embodiments of the present invention, the pressure $P_1$ and/or pressure $P_2$ and/or the differential pressure $\Delta P_1$ and/or the differential pressure $\Delta P_2$ may be used to determine flow characteristics/flow rates of the fluid flow 20.

In some embodiments, the choke 15 may be used to change the flow properties of the fluid flow 20 and flow characteristics/flow rates for the different flows produced by the alteration of the choke 15 may be determined from pressure measurements/differential pressure measurements made in at least one of the two Venturis. In other embodiments, the choke 15 may be used to change the flow properties of the fluid flow 20 in the two Venturis so that characteristics of the fluid flow 20 may be determined from pressure measurements made in one or both of the two Venturis. In some embodiments, a processor 36 may be used to process the flow characteristics/flow rates of the fluid flow 20 through each and/or both of the two Venturis and/or properties of the multiphase mixture making up for the fluid flow 20 from the pressure measurements/differential pressure measurements. Additionally the processor 36 and/or one or more additional processors may be used to control the choke 15 and/or receive signals from the choke 15 regarding the operation of the choke 15.

In one embodiment of the present invention, the first and the second Venturis may7 be identical. For example, the first and the second Venturis may7 have equivalent throat dimensions and equivalent inflow and outflow dimensions. In such embodiments, the choke 15 may be used to provide that the flow properties of a multiphase mixture flowing through the multiphase flowmeter 3 are different in the first Venturi 5 than they are in the second Venturi 10. Moreover, in some embodiments, the choke 15 is configured to be a variable choke and flow in at least one of the Venturis may be changed by varying the choke. In such aspects, the choke 15 may be varied so that the multiphase mixture flow can be measured by the multiphase flowmeter 3.

In an embodiment of the present invention, Venturi theory may be used to process the pressure measurements according to the following relationships for the multiphase flowmeter:

$$\Delta P_1 = K_1 \frac{\dot{m}_{tot}^2}{\rho_{mix1}} \quad (1)$$

and $$\Delta P_2 = K_2 \frac{\dot{m}_{tot}^2}{\rho_{mix2}} \quad (2)$$

where:

$$K_1 \cong \frac{1-\beta_1^4}{2C_{d1}A_{T1}^2} \quad (3a)$$

and $$K_2 \cong \frac{1-\beta_2^4}{2C_{d2}A_{T2}^2} \quad (3b)$$

where:
$C_d$ is the Venturi discharge coefficient;
$A_T$ is the Venturi throat cross-sectional area;
$\beta$ is the ratio of Venturi throat diameter to its inlet diameter;
$\dot{m}_{tot}$ is the total mass flow rate of the multiphase mixture flowing through the multiphase flowmeter (which is the same at each Venturi in the multiphase flowmeter); and
$\rho_{max}$ is the flowing mixture density at the Venturi (which will not be the same at each Venturi because of the pressure drop and consequent gas expansion across the choke 15);

In an embodiment of the present invention, using the assumption of isothermal gas expansion, (which may be corrected in some embodiments of the present invention using temperature measurements made in the multiphase flowmeter using temperature sensors (not shown) gives the following:

$$\rho_{g2} = \rho_{g1} \frac{p_2}{p_1} \quad (4)$$

where:
$P_i$ is the pressure at the throat of the i-th Venturi.

In certain aspects of the present invention, if the two Venturis are configured to be horizontal, there is no need to consider slip, so that:

$$\rho_m = \frac{\dot{m}_{tot}}{\frac{\dot{m}_g}{\rho_g} + \frac{\dot{m}_l}{\rho_l}} \quad (5)$$

where:
$\dot{m}_g$ and $\dot{m}_l$ are the mass flow rates of a gas phase and a liquid of the multiphase mixture flowing through the flowmeter 3, which, again, are the same for both the first Venturi 5 and the second Venturi 10; and $\rho_g$ and $\rho_l$ are the densities of the liquid phase and the gas, respectively.

In some embodiments of the present invention the densities of the phases of the multiphase mixture may be known functions of the pressure and temperature of the multiphase mixture. In other embodiments of the present invention, the densities of the phases of the multiphase mixture may be Calculated, measured, known from prior experience and/or the like. Merely by way of example, in the hydrocarbon industry, the densities of the phases of a multiphase mixture may be known from previous experience with a particular well, from sampling from the well and/or the like.

In embodiments of the present invention, the above equations are processed by substitution to yield the gas phase and liquid phase flow rates of the multiphase mixture flowing in the section of pipe. Merely by way of example, in some embodiments, the flowmeter 3 may be configured with two identical Venturis. In such embodiments, assuming no slip, this configuration provides that:

$$\frac{\Delta P_1}{\Delta P_2} = \frac{\rho_{mix2}}{\rho_{mix1}} = \frac{\frac{\dot{m}_g}{\rho_{g1}} + \frac{\dot{m}_l}{\rho_l}}{\frac{\dot{m}_g P_1}{\rho_{g1} P_2} + \frac{\dot{m}_l}{\rho_l}} \quad (6)$$

and hence $$\frac{\dot{m}_g}{\rho_{g1}}\left[\frac{\Delta P_1}{\Delta P_2}\frac{P_1}{P_2} - 1\right] = \frac{\dot{m}_l}{\rho_l}\left[1 - \frac{\Delta P_1}{\Delta P_2}\right] \quad (7)$$

which equation can be substituted into equation (1) above to calculate the mass flow rates of the liquid phase and/or the gas phase of the fluid flow 20:

$$\Delta P_1 = \dot{m}_l^2 \frac{K_1}{\rho_l}\left(1 + \frac{\rho_{g1}}{\rho_l}\frac{1 - \frac{\Delta P_1}{\Delta P_2}}{\frac{\Delta P_1}{\Delta P_2}\frac{P_1}{P_2} - 1}\right)\left(1 + \frac{1 - \frac{\Delta P_1}{\Delta P_2}}{\frac{\Delta P_1}{\Delta P_2}\frac{P_1}{P_2} - 1}\right) \quad (8)$$

so that:

$$\dot{m}_l = \sqrt{\frac{\Delta P_1 \rho_l}{K_1}\frac{1}{\left(1 + \frac{\rho_{g1}}{\rho_l}\frac{1 - \frac{\Delta P_1}{\Delta P_2}}{\frac{\Delta P_1}{\Delta P_2}\frac{P_1}{P_2} - 1}\right)\left(1 + \frac{1 - \frac{\Delta P_1}{\Delta P_2}}{\frac{\Delta P_1}{\Delta P_2}\frac{P_1}{P_2} - 1}\right)}} \quad (9)$$

and $$\dot{m}_g = \frac{\rho_{g1}}{\rho_l}\frac{1 - \frac{\Delta P_1}{\Delta P_2}}{\frac{\Delta P_1}{\Delta P_2}\frac{P_1}{P_2} - 1}\sqrt{\frac{\Delta P_1 \rho_l}{K_1}\frac{1}{\left(1 + \frac{\rho_{g1}}{\rho_l}\frac{1 - \frac{\Delta P_1}{\Delta P_2}}{\frac{\Delta P_1}{\Delta P_2}\frac{P_1}{P_2} - 1}\right)\left(1 + \frac{1 - \frac{\Delta P_1}{\Delta P_2}}{\frac{\Delta P_1}{\Delta P_2}\frac{P_1}{P_2} - 1}\right)}} \quad (10)$$

In embodiments of the present invention, the preceding equations may be used with an appropriate slip model to correct the processed fluid properties for slip. The slip models may be based on experimentation, experience, modeling, theory and/or the like. The slip models may in some aspects be tuned to the expected properties of the fluid flow 30. In certain aspects, the equation set for determining the flow rates of the multiphase mixture flow may need to be solved by numerical means.

In some embodiments, orifice plate flow meters may be used instead of or in combination with the first/second Venturi flow meters. In certain embodiments of the present invention, the flowmeter described herein may be used for managed pressure drilling ("MPD") applications. In embodiments of the present invention, such as embodiments used in MPD, flow history of the multiphase mixture may be known from other measurements made during the MPD process or the like, and this known flow history may be used to calibrate/auto calibrate the flowmeter 3. For example, the flowmeter of the present application may be calibrated during known flow conditions, i.e. where the flow is a single phase or the like, or calibrated by a surface/topside multiphase flow meter.

Managed pressure drilling is a drilling method that allows for reduction of the mud weight while retaining the ability to safely control initial reservoir pressures. Managed pressure drilling ("MPD") may be used to control the pressure during the drilling process to address the issues of kicks, loss of circulation of drilling fluid due to egress of the drilling fluid through fractures into the formation, formation fracturing, formation damage, or formation collapse. MPD may be particularly applicable when the formation pressure has fallen below the original formation pressure or a narrow operational window exists between the BHP at which the formation will fracture ("the fracture pressure") and the formation pressure.

In MPD, the annulus may be closed using a pressure containment device. This device includes sealing elements, which engage with the outside surface of the drillstring so that flow of fluid between the sealing elements and the drill string is substantially prevented, The sealing elements may allow for rotation of the drillstring in the borehole so that the drill bit on the lower end of the drillstring may be rotated. A flow control device may be used to provide a flow path for the escape of drilling fluid from the annulus. After the flow control device, a pressure control manifold with at least one adjustable choke or valve may be used to control the rate of flow of drilling fluid out of the annulus. When closed during drilling, the pressure containment device creates a back pressure in the wellbore, and this back pressure can be controlled by using the adjustable choke or valve on the pressure control manifold to control the degree to which flow of drilling fluid out of the annulus/riser annulus is restricted.

During MPD an operator may monitor and compare the flow rate of drilling fluid into the drill string with the flow rate of drilling fluid out of the annulus to detect if there has been a kick or if drilling fluid is being lost to the formation. A sudden increase in the volume or volume flow rate out of the annulus relative to the volume or volume flow rate into the drill string may indicate that there has been a kick. By contrast, a sudden drop in the flow rate out of the annulus relative to the flow rate into the drillstring may indicate that the drilling fluid has penetrated the formation.

In some MPD procedures, gas may be pumped into the annulus between the drillstring and the borehole wall in order to reduce bottomhole-pressure while drilling. However, initiating the process of gas injection into the annulus so that the bottomhole pressure remains under control can be problematic as it can produce large fluctuations in well pressure and achieving a steady-state may take hours of unproductive time and large volumes of gas.

Annular gas injection is a process for reducing the bottomhole-pressure in a well. In many annular gas injection systems, in addition to casing in the well, the casing being a tubing that lines the borehole and may in some cases be cemented to the wall of the borehole, there is a secondary annulus. This secondary annulus may be connected by one or more orifices at one or more depths to the primary annulus, through which the drilling fluids flow.

A concentric casing injection system comprises a gas injection annulus that surrounds a drilling annulus, which drilling annulus also referred to herein as an inner annulus is formed between a drillstring disposed in the borehole and a casing string lining the borehole. The gas injection annulus comprises an annulus between the casing string that forms the drilling/inner annulus, for clarity referred to as a first casing string, and a second casing string disposed concentrically around the first casing string. Gas is pumped into the gas injection annulus and through injection ports into the drilling annulus. During gas injection procedures, the concentric casing injection system may become/be unstable because of among other things the combination of the large volume and compliance of the gas in the injection annulus along with the history dependent hydrostatic head of the drilling annulus. During gas injection, oscillations in bottomhole pressure of up to 2000 psi with a duration of more than two (2) hours have been recorded. The concentric, casing injection system can be damped to prevent such large and/or long-duration oscillations by reducing the size/area of the injection ports. However, restricting the size of the injection ports can make it almost impossible for the gas injection system to displace mud out of the gas injection annulus and so gas injection into the inner annulus is prevented or restricted.

Figure 2A:
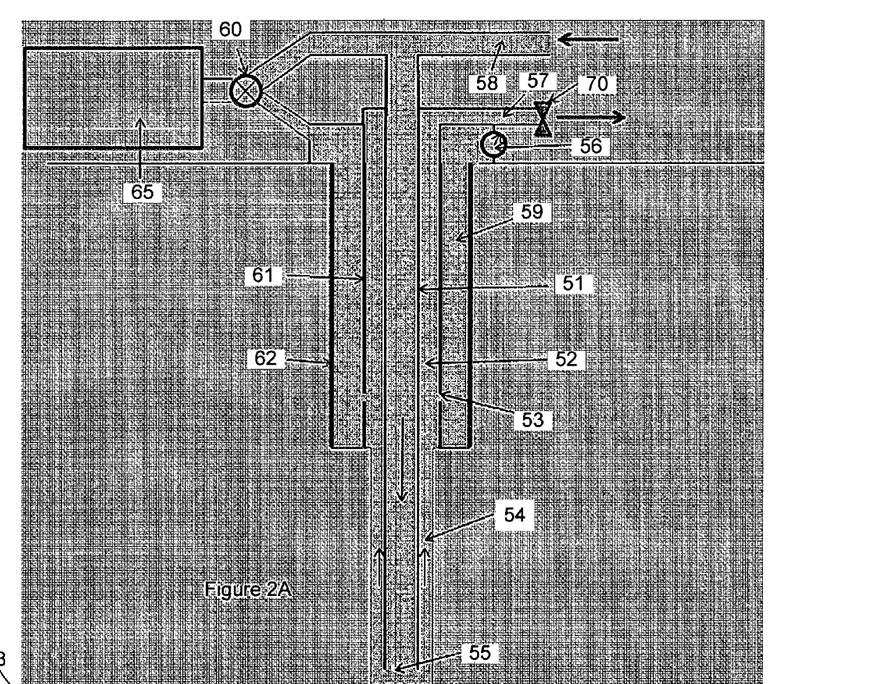
FIG. 2A illustrates a managed pressure drilling system to which a multiphase flowmeter, in accordance with an embodiment of the present invention, may7 be attached to determine flow properties of a multiphase mixture flowing in the managed pressure drilling system.

FIG. 2A illustrates the situation in a drilling system with a secondary/outer annulus before gas injection. As depicted, a drillstring 51 is suspended in the wellbore. In the upper section of the wellbore there is an inner annulus 52 and a first casing string 61 that is hydraulically connected/in fluid communication with an outer annulus 59 through one or more orifices 53. The outer annulus may be cased by a second casing string 62.

Drilling fluid (also referred to herein as drilling mud or mud) may be pumped from a pump(s) (not shown) through pipework 58 into the drillstring 51, down which it passes until it exits at a distal end 55, through a drill bit (not shown) or the like, before returning via the inner annulus 52 and return pipework 57 to fluid tanks for handling/preparing the drilling fluid. Between the pipework 57 and the fluid tanks (not shown) there may be chokes 70 and separators (not shown). The outer annulus 59 and the pipes feeding the top of the drillstring are connected to gas pumps 65, via a valve manifold 60, which may direct gas either to the drillstring feed, to the outer annulus 59 or optionally to both at once. In some embodiments of the present invention, measurement of the pressure and other measurements may be made in the outer annulus 59, the inner annulus 52, the drillstring 51 and/or the like. In addition to the described equipment, there may be many other pieces of equipment at the surface, such as blow-out-preventers, a rotating-control-head, etc, which are normal with managed-pressure drilling, but which may not be involved in the procedure detailed here, and hence for clarity not shown.

In an embodiment of the present invention, in an MPD procedure, a choke on the return line, i.e., choke 70, may be used to drop the pressure from the well head pressure (merely by way of example this may comprise a pressure in the range of 50-250 psi) to a separator pressure (merely by way of example this may comprise a pressure in the range of 5-20 psi). In MPD, the choke on the return line is used to drop the pressure of the multiphase mixture flowing out of the well so that a separator, such as a mud gas separator or the like can be used to separate the phases of the multiphase mixture flowing out of the well. In MPD, the flow properties of the multiphase mixture, including the flow properties of the different phases making up the multiphase mixture, may be monitored/measured in order to manage the MPD process, determine properties of the drilling process, determine properties of the wellbore/formation surrounding the formation and/or the like. Often, Coriolis-type flowmeters are used to measure the multiphase flow in the return line. However, these Coriolis-type flowmeters may not be able to make measurements when the multiphase flow in the return line has a high gas-to-liquid ratio/high gas cut.

Figure 2B:
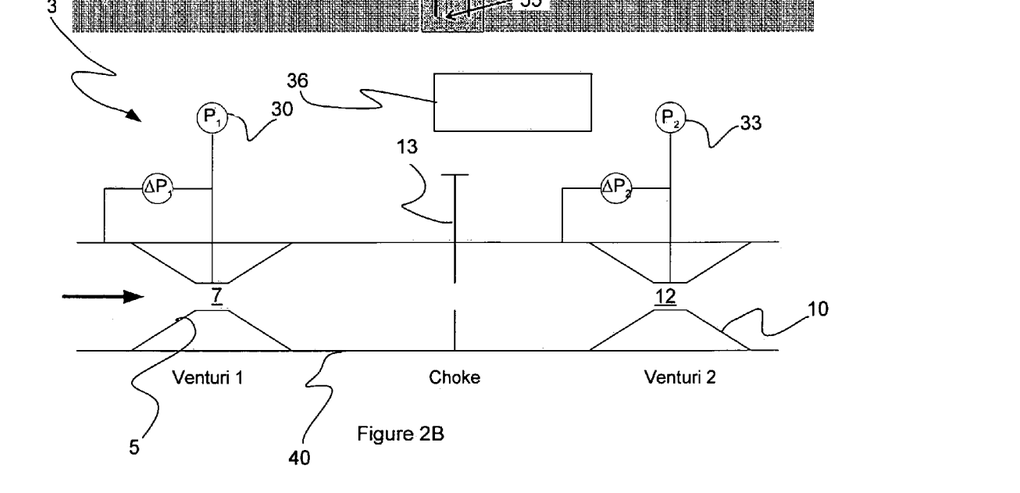
FIG. 2B illustrates a multiphase flowmeter for use in the managed pressure drilling system of FIG. 2A, in accordance with an embodiment of the present invention.

FIG. 2B depicts an embodiment of the present invention, wherein two Venturis, a first Venturi 5 and a second Venturi 10 are configured on a return line 40 on either side of a choke 13 in an MPD system. In an embodiment of the present invention, the choke 13 may comprise an MPD choke for dropping wellhead pressure of a multiphase mixture flowing out of/in the MPD system. The first venturi 5 and/or the second Venturi 10 may comprise orifice plates or the like.

A multiphase flowmeter 3, as depicted in FIG. 2B, includes a first pressure sensor 30 and a second pressure sensor 33. The first pressure sensor 30 may be configured to measure a pressure in a throat 7 of the Venturi 5 and/or a differential pressure between the throat 7 and a location upstream or downstream of the throat 7 in the return line 40. The first pressure sensor 30 may in some aspects comprise multiple pressure sensors. The second pressure sensor 33 may be configured to measure a pressure in a throat 12 of the Venturi 10 and/or a differential pressure between the throat 12 and a location upstream or downstream of the throat 12 in the return line 40. The second pressure sensor 30 may in some aspects comprise multiple pressure sensors.

In the depicted embodiment, the expansion of the fluid mixture resulting from operation of the choke 13, which fluid mixture may comprise a gas phase and a liquid phase, provides a change in the flow characteristics of the fluid mixture and enables a gas/liquid flow measurement(s) to be made using pressure measurements made by the pressure sensor 30 and/or the pressure sensor 33. In one embodiment, a processor 36 may control the MPD operation based on the measurements of the flow properties of the multiphase mixture in the return line 40 from the multiphase flowmeter 3 and/or the processor 36 may output data regarding the status of the MPD, the drilling of the borehole and/or the like based upon measurements of the flow properties of the multiphase mixture in the return line 40 from the multiphase flowmeter 3.

In embodiments of the present invention, for MPD, a measurement of the outflow rate and the outflow gas fraction may be made on the outflow of the well, i.e., in the return line 40 etc., to monitor changes in the outflow rate of the multiphase mixture exiting the well and the outflow gas fraction for the well. This data may be used for influx/efflux detection, for determining gas distribution in the well, for monitoring/controlling the MPD operation and/or the like.

Coriolis meters may be used on many conventional MPD operations, but they are not effective for gas fractions of more than 5%. Typical operating conditions for many MPD wells will have a high gas fraction (>70% under well head conditions) and a back pressure in the range 50-300 psi, or about 60-250 psi although, in certain aspects, for safety reasons the flowmeter assembly may be capable of operating up to 1000 psi.

In a conventional geometry the return from the well will drop to the ground level, go through a choke and then into a separator. The choke will drop the pressure from the well head pressure to the separator pressure, typically from about 60-250 psi to 5-20 psi (gauge).

Figure 3:
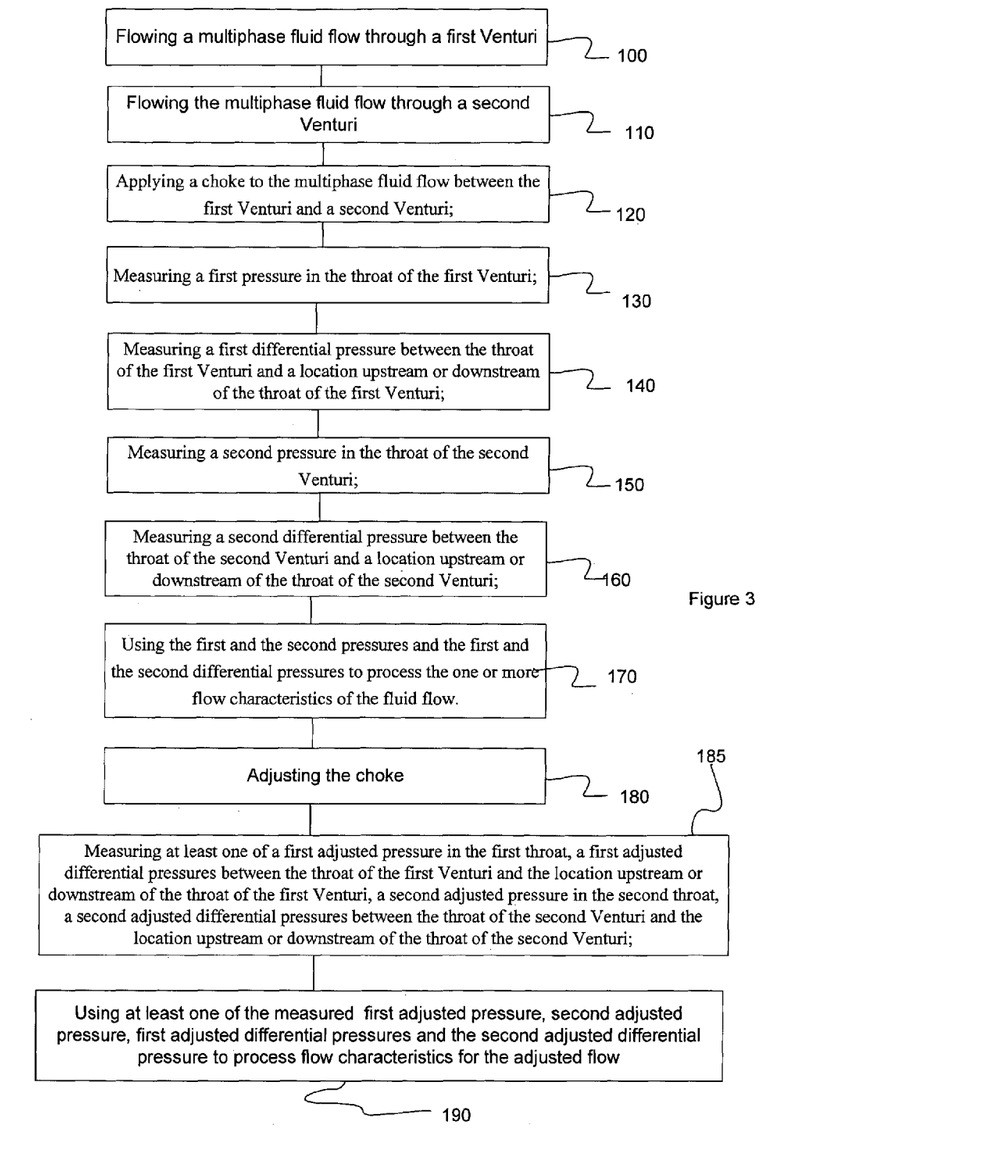
FIG. 3 is a flow-chart type illustration of a method for measuring properties of a multiphase flow, in accordance with an embodiment of the present invention.

FIG. 3 illustrates a method for measuring properties of a multiphase flow, in accordance with an embodiment of the present invention. In step 100, a multiphase fluid mixture flowing in a conduit is passed through a first Venturi. In step 110, the multiphase fluid mixture is passed through a second Venturi and in step 120 the multiphase fluid mixture is passed through a choke. In certain aspects, one or more of the Venturis may comprise orifice plates. In some embodiments of the present invention, the choke is adjustable so that it can be varied to change the flow properties of the multiphase fluid mixture. In some aspects, the choke is a choke in a return line in an MPD system and is used to drop the wellhead pressure so that the multiphase fluid mixture in the MPD can be flowed into a separator.

In step 130, a first pressure in the throat of the first Venturi is measured. In step 140, a first differential pressure between the throat of the first Venturi and a location upstream or downstream of the throat of the first Venturi is measured. In step 150, a second pressure in the throat of the second Venturi is measured. In step 160, a second differential pressure between the throat of the second Venturi and a location upstream or downstream of the throat of the second Venturi is measured.

In step 170, the measured pressures and differential pressures may be processed to determine flow characteristics of the multiphase fluid flow. In step 180, the choke is adjusted to alter the flow of the multiphase fluid mixture. In step 185, at least one of the pressure in the throat of the first Venturi, the pressure in the throat of the second Venturi, the first differential pressure between the throat of the first Venturi and the position upstream or downstream of the first Venturi and the differential pressure between the throat of the second Venturi and the position upstream or downstream of the second Venturi is measured after the choke has been adjusted.

In step 190, the at least one of the pressure in the throat of the first Venturi, the pressure in the throat of the second Venturi, the first differential pressure between the throat of the first Venturi and the position upstream or downstream of the first Venturi and the differential pressure between the throat of the second Venturi and the position upstream or downstream of the second Venturi is measured after the choke has been adjusted is processed to determine flow properties of the multiphase fluid mixture after adjustment of the choke.

In embodiments of the present invention, the flow of the multiphase fluid mixture in the two Venturis is different because of the effect of the choke that is disposed between the two Venturis. By measuring pressures and differential pressures for the two Venturis, flow properties of the multiphase flow mixture can be determined. In some aspects of the present invention, the choke is adjusted and new pressures may be measured with respect to the two Venturis. One or more of these adjusted choke pressures and/or knowledge about the multiphase flow prior to adjustment may be used to determine flow properties of the multiphase fluid mixture after choke adjustment. In some embodiments, the choke may be repeatedly adjusted and pressure measurements made in order to determine properties of the multiphase fluid mixture. In some embodiments of the present invention, the two Venturis may be identical and/or may be arranged horizontally with respect to the multiphase fluid flow. A slip correction may be used in the processing of the fluid properties to adjust for slip between the phases in the multiphase fluid mixture.

While the principles of the disclosure have been described above in connection with specific apparatuses and methods, it is to be clearly understood that this description is made only by way of example and not as limitation on the scope of the invention.

What is claimed is:

1. A method for measuring one or more flow characteristics of a multiphase fluid flowing through a conduit, comprising:
    flowing the multiphase fluid flow through a first Venturi and a second Venturi;
    choking the multiphase fluid flow, wherein the multiphase fluid flow is choked at a location in the conduit between the first Venturi and the second Venturi;
    measuring a first pressure in a throat of the first Venturi;
    measuring a first differential pressure between the throat of the first Venturi and a first position in the conduit upstream or downstream of the throat of the first Venturi;
    measuring a second pressure in the throat of the second Venturi;
    measuring a second differential pressure between the throat of the second Venturi and a second position in the conduit upstream or downstream of the throat of the second Venturi; and
    using the first and the second pressures, the first and the second differential pressures and a slip approximation to process the one or more flow characteristics of the multiphase fluid flow.

2. The method of claim 1, further comprising:
    adjusting the choke applied to the multiphase fluid flow;
    measuring at least one of a first adjusted pressure in the throat of the first Venturi, a second adjusted pressure in the throat of the second Venturi, a first adjusted differential pressure between the throat of the first Venturi and a first position in the conduit upstream or downstream of the throat of the first Venturi and a second adjusted differential pressure between the throat of the second Venturi and a first position in the conduit upstream or downstream of the throat of the second Venturi.

3. The method of claim 2, further comprising:
    processing the one or more flow characteristics of the fluid flow from the measured at least one of the first adjusted pressure, the second adjusted pressure, the first adjusted differential pressure and the second adjusted differential pressure.

4. The method of claim 1, wherein the one or more flow characteristics of a fluid flow comprise a flow rate of the multiphase fluid flow.

5. The method of claim 1, wherein the one or more flow characteristics of a fluid flow comprise at least one of a mass and/or volumetric flow rate of a liquid phase of the multiphase fluid flow and a mass and/or volumetric flow rate of a gas phase of the multiphase fluid flow.

6. The method of claim 1, further comprising:
    using the one or more flow characteristics to control a managed pressure drilling operation.

7. The method of claim 1, wherein at least one of the first and the second Venturis is substituted with an orifice plate.

8. The method of claim 1, further comprising:
    using a processor to process the one or more flow characteristics of the fluid flow.

9. The method of claim 1, further comprising:
    using a processor to control the choke.

10. The method of claim 1, further comprising:
    adjusting the choke based upon the processed one or more flow characteristics of the fluid flow.

11. A system measuring one or more flow characteristics of a multiphase fluid flow, comprising:
    a first Venturi:
    a first pressure sensor configured to measure a first pressure in the throat of the first Venturi;
    a first differential pressure sensor configured to measure a first differential pressure between the throat of the first Venturi and a location upstream or downstream of the throat of the first Venturi;
    a second Venturi:
    a second pressure sensor configured to measure a second pressure in the throat of the second Venturi;
    a second differential pressure sensor configured to measure a second differential pressure between the throat of the second Venturi and a location upstream or downstream of the throat of the second Venturi; and
    a choke disposed between the first and the second Venturis, wherein the choke comprises a managed pressure drilling choke configured to vary a wellhead pressure of a managed pressure drilling system.

12. The system of claim 11, further comprising:
    a processor configured to process the one or more flow characteristics of the fluid flow from the first pressure, the second pressure, the first differential pressure and the second differential pressure.

13. The system of claim 12, wherein an output from the processor is used to control a managed pressure drilling operation.

14. The system of claim 11, further comprising:
    a processor for controlling operation of the choke.

15. The system of claim 11, wherein the first Venturi and the second Venturi have equivalent physical dimensions.

16. The system of claim 15, wherein the first Venturi and the second Venturi comprise equivalent throat dimensions.

17. The system of claim 11, wherein the first and the second Venturi are configured to be disposed at least one of horizontally, vertically or deviated from one another.

18. The system of claim 11, wherein at least one the first and the second Venturis comprise an orifice plate.

19. The system of claim 11, wherein the choke is adjustable.

* * * * *